United States Patent [19]

Rüegg et al.

[11] Patent Number: 4,715,739
[45] Date of Patent: Dec. 29, 1987

[54] CONNECTION BETWEEN A PLASTICS QUILL SHAFT AND A METAL ELEMENT

[75] Inventors: Christoph Rüegg, Basel; Peter Voirol, Binningen; Willi Fuchs, Basel; Hans U. Meister, Riehen, all of Switzerland

[73] Assignee: Ciba-Geigy Corporation, Ardsley, N.Y.

[21] Appl. No.: 347,403

[22] Filed: Feb. 10, 1982

[30] Foreign Application Priority Data

Feb. 18, 1981 [CH] Switzerland .................. 1070/81

[51] Int. Cl.⁴ ............................................. F16B 4/00
[52] U.S. Cl. ...................................... 403/30; 403/273;
403/373; 285/381
[58] Field of Search .................. 403/373, 28, 30, 273,
403/300; 285/242, 256

[56] References Cited

U.S. PATENT DOCUMENTS

| 3,638,979 | 2/1972 | Francois et al. | 287/124 |
| 3,788,098 | 1/1974 | Miller et al. | 64/11 R |
| 3,905,208 | 9/1975 | Oyama et al. | 64/11 R |
| 4,149,911 | 4/1979 | Clabburn | 148/11.5 R |
| 4,293,147 | 10/1981 | Metcalfe et al. | 285/242 X |

FOREIGN PATENT DOCUMENTS

| 0028978 | 5/1981 | European Pat. Off. . |
| 2306215 | 8/1974 | Fed. Rep. of Germany . |
| 2428515 | 1/1980 | France . |
| 873095 | 2/1959 | United Kingdom | 285/381 |

Primary Examiner—Thomas F. Callaghan
Attorney, Agent, or Firm—Harry Falber

[57] ABSTRACT

The end region of the fibre reinforced plastics hollow shaft (1) is clamped between an outer ring (3) and an inner ring (21) provided on the metal part (2) which is to be connected to the shaft. The two rings are clamped to the shaft wall and to one another so that there is a frictional connection between the shaft (1) and the metal part (2). The rings are clamped thermally by shrinking the rings on and into the shaft. This type of connection between a plastics shaft and a metal part is very simple and effective. (FIG. 1).

7 Claims, 10 Drawing Figures

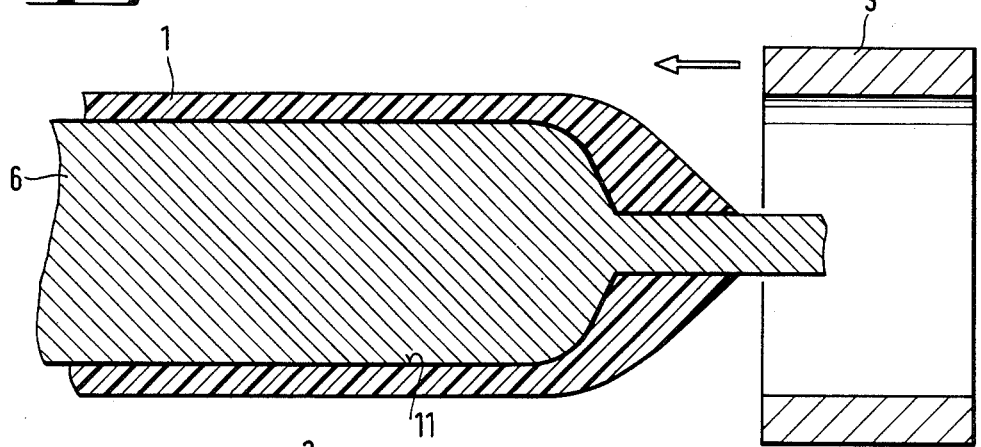
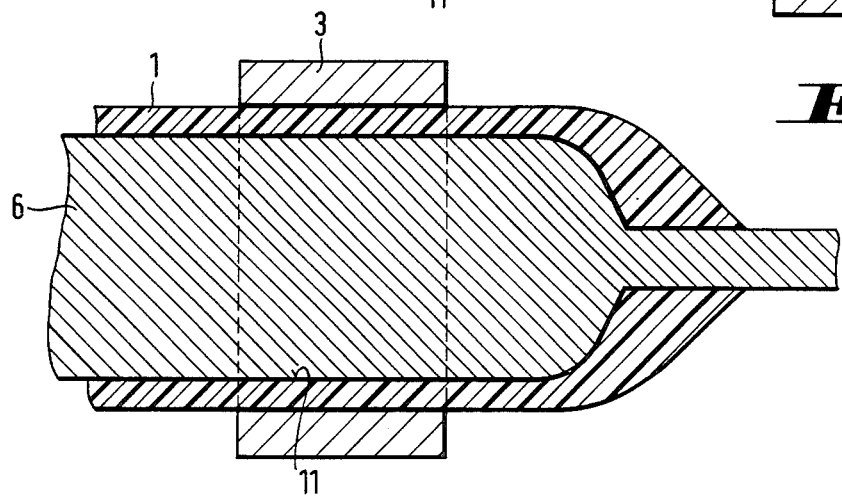
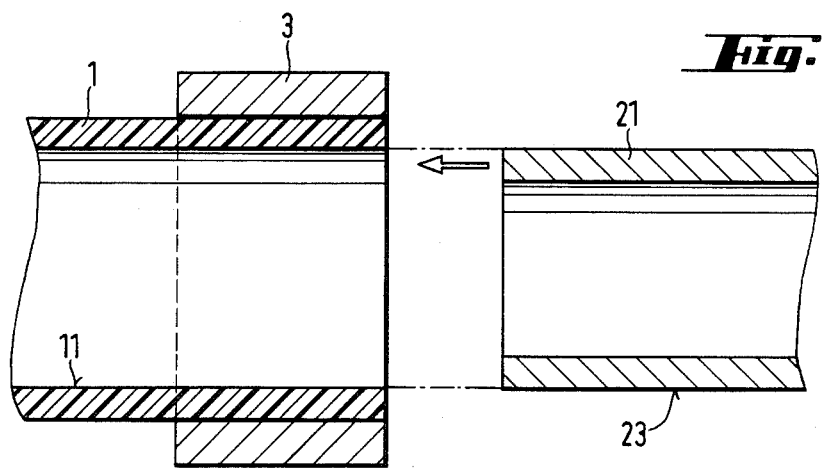

CONNECTION BETWEEN A PLASTICS QUILL SHAFT AND A METAL ELEMENT

The invention relates to a connection between a quill shaft, consisting of a fibre-reinforced plastics tube, and a metal element, more particularly a power input fitting, and to a method of making such a connection.

There is an ever-increasing use of fibre-reinforced plastics as constructional material. For example, power transmission shafts for machines, and particularly for motor vehicles, have already been made from this material. Further details on this will be found, for example, in Published European Patent Application No. 0009007.

One of the main difficulties in the construction of such quill shafts made from plastics is the power input to the shaft. The torque input is usually by means of a metal connecting or transition member, known as a fitting, which must be suitably connected to the shaft so as to prevent relative rotation between the two. A number of solutions have already been proposed to the problem of securing the fitting on or in the shaft. For example, the fitting according to U.S. Pat. No. 4,041,599 is non-positively connected to the shaft by gluing, whereas, for example, the connection according to European Published Patent Application No. 0009007 is by means of bolts and is accordingly positive. Combinations of positive and non-positive connections are also known for such purposes. However, none of these possible connections has proved satisfactory in practice. In some cases they are too complicated and expensive to manufacture while in others they are not suitable for transmitting the frequently fairly high torques.

The object of this invention is to obviate this drawback and provide an efficient and easily produced connection between plastics shafts and metal parts. The invention also provides a method of making such a connection.

The connection according to the invention is thus based on the principle of a frictional connection. Ordinary frictional connections in which the parts to be connected are thermally clamped together (shrunk connections) are conventional in metal construction, e.g. for fixing gearwheels on drive shafts. However in that case the parts are always of the same or comparable materials with similar strength properties. The direct use of this shrinkage technique for connecting such diverse materials as metal and fibre-reinforced plastics is impossible. Only the principle according to the invention in which the tube wall is clamped on both sides between two rings has opened up the advantageous shrinkage technique for this application as well.

The invention will be explained in detail hereinafter with reference to the drawing wherein:

FIGS. 3–7 are diagrams showing the various stages of a first variant of the method according to the invention and FIGS. 8–10 show the stages of a second variant of the method.

Figure 1:
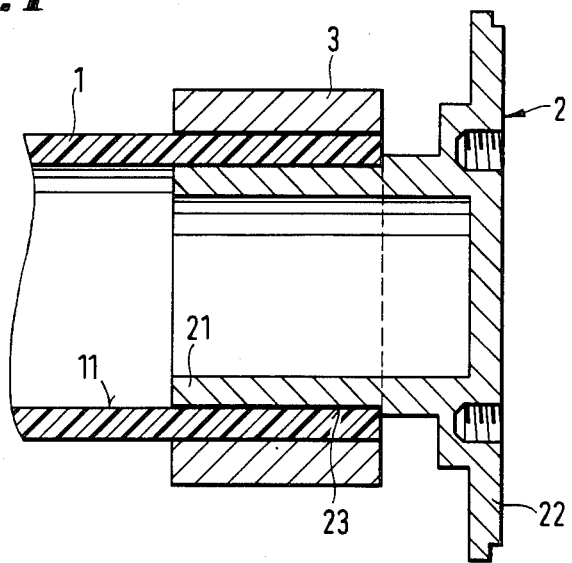
FIGS. 1 and 2 are each a section of an exemplified embodiment of a connection according to the invention.

FIG. 1 shows the connection between a fibre reinforced plastics power transmission shaft 1 and a metal power input fitting 2. The end of the shaft 1 is clamped between an inner ring 21 which, together with the flange 22, forms the fitting 2, and an outer coacting ring 3 in the manner to be explained hereinafter. Power transmission is by frictional contact between the outer surface 23 of the inner ring 21 and the inner surface 11 of the shaft 1.

Figure 2:
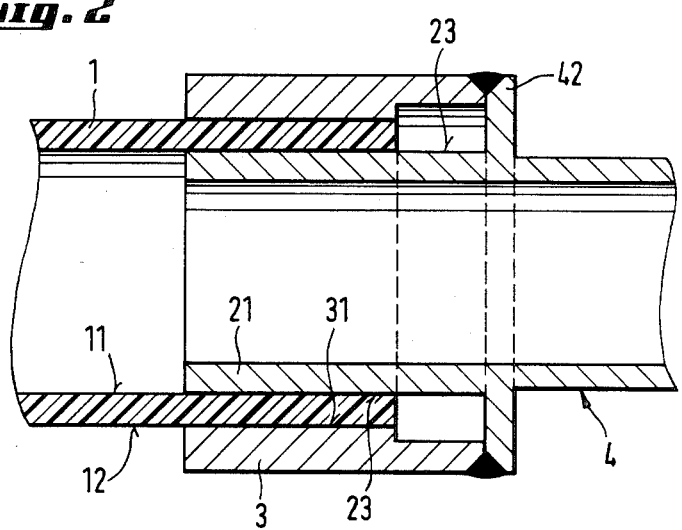
Figure 3:
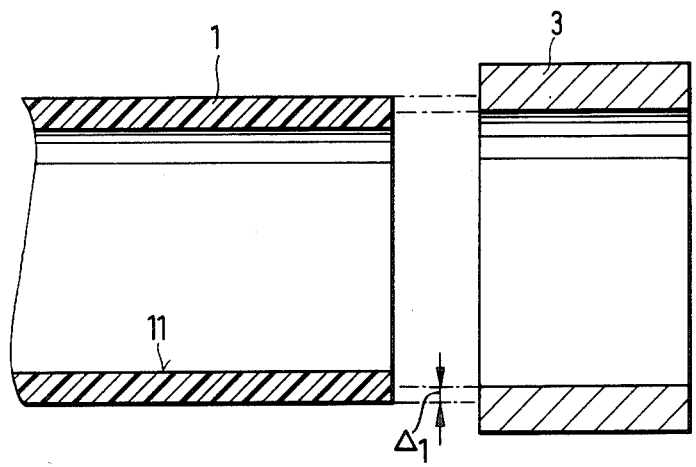

In the variant shown in FIG. 2, the ring 3 is somewhat longer and is welded to a radial flange 42 of the metal part 4, which is in this case tubular. In this way the frictional connection between the outer surface 12 of the shaft and the inner surface 32 of the ring 3 is also utilized for power transmission and consequently much greater forces can be transmitted between the shaft 1 and the metal part 4. Ring 3 and metal part 4 can of course be interconnected in some other way instead of by welding.

The connection illustrated is, of course, suitable for transmitting not only torque, but also axial forces. The metal part connected to the shaft may be of any desired form assuming that it has a bush or sleeve or ring as shown in the drawings. The metal part can therefore be a power input fitting pure and simple or itself be a shaft. The two rings clamping the shaft wall between them can, of course, also be changed over, i.e. the ring of the metal part could be mounted on the shaft.

The individual parts of the connection are assembled and clamped basically in accordance with shrinkage technology known in metal construction, such technology making use of the fundamental property of most constructional materials to expand and contract on a change of temperature.

FIGS. 3–7 show the various stages of a first variant of the method. First of all the outer ring 3 is prepared so that its inside diameter (at the same temperature) is somewhat smaller than the outside diameter of the shaft end 1 requiring to be clamped, the outer surface of which is turned to an accurate tolerance. The oversize (difference between the radii) is shown by reference $\Delta_1$ in FIG. 3.

Figure 4:
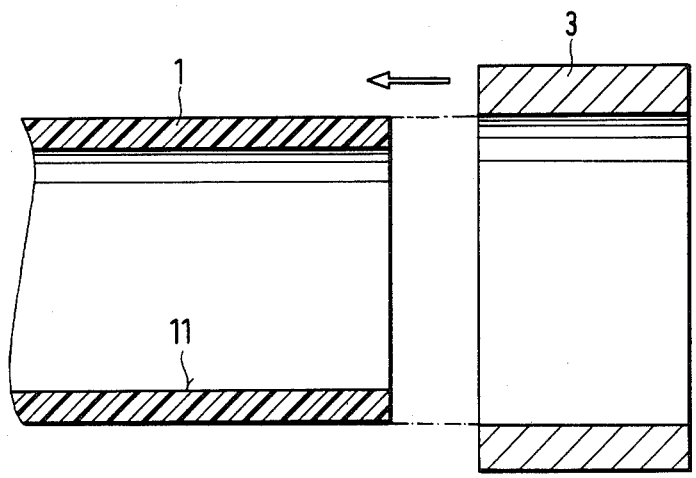

The outer ring 3 is then heated or the shaft 1 cooled until the ring is wider than the shaft and can be slipped over the latter (FIG. 4).

Figure 5:
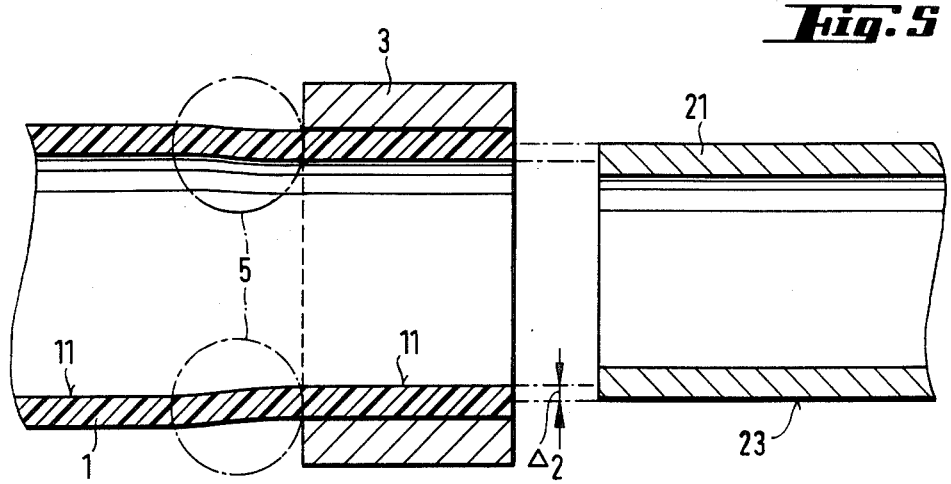
Figure 6:
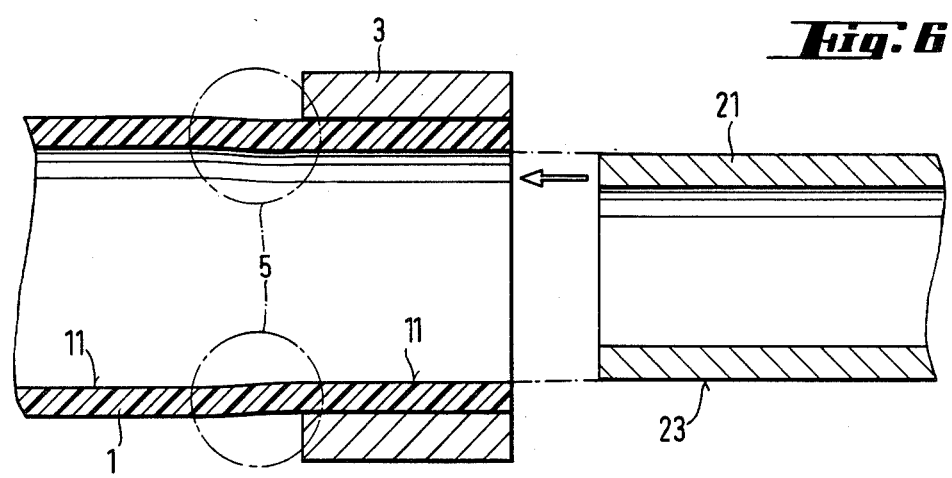
Figure 7:
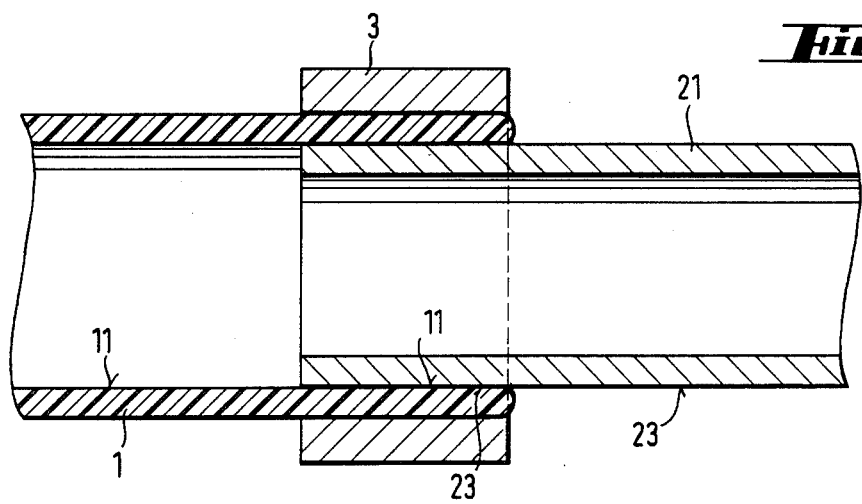

On the subsequent temperature equalization the ring shrinks or the shaft expands and the two parts are clamped together. In these conditions there is a slight reduction of the mean shaft diameter in the clamped area (FIG. 5). The inner ring 21 belonging to the metal part and the outside diameter of which, at the same temperature, is somewhat larger than the inside diameter of the shaft (oversize $\Delta_2$) is reduced in size in relation to the shaft by cooling and/or heating of the shaft with the ring 3 shrunk thereon (FIG. 6) until it can be inserted into the shaft. On the subsequent temperature equalization the inner ring and the shaft clamp together and if the original oversizes $\Delta_1$ and $\Delta_2$ of the two rings were of suitable value the reduction in the diameter of the clamped shaft end produced by the shrinking-on of the outer ring is cancelled out (FIG. 7).

For the fatigue strength of the shaft and the connection it is extremely important that the stresses produced in the finished connection by the rings 3 and 21 should not produce any permanent deformation of the shaft, which would result in additional internal stresses in the shaft and hence a reduction in the capacity to take loads from external forces. Such deformation as shown, for example, in FIGS. 5 and 6 at the transitions 5 between the clamped and non-clamped shaft area can be obtained by suitable dimensioning of the oversizes $\Delta_1$ and $\Delta_2$ of the two rings and hence of the stresses produced by them on temperature equalization. Optimum conditions are for the additional stresses and forces produced by the outer and inner ring to cancel one another out, so that only the wall of the shaft is compressed somewhat while the mean shaft diameter remains constant. The absolute magnitude of the prestressing of the rings or of the consequent pressing and frictional forces between the rings and the shaft naturally depends on the torques and forces requiring to be transmitted between these two parts. The dimensioning may be similar to metal-metal frictional connections.

If one of the two rings between which the shaft is clamped is circumferentially very rigid in relation to the other, e.g. at least by a factor of about 5, the required clamping effect can also be produced by shrinking just the other less rigid ring on to or into the shaft. The risk of shaft deformation is then much less because of the rigidity of one of the rings. This method requires one shrinkage operation less but requires more rigid and hence necessarily larger or thicker and accordingly heavier rings, and this is undesirable for many applications.

FIGS. 8–10 diagrammatically illustrate another very advantageous method of producing a connection according to the invention. The outer ring 3 is applied to the shaft 1 during the actual manufacture of the latter. The shaft is situated on a former 6 and the plastics matrix has not yet finally set but is still relatively soft and deformable.

The inside diameter of the ring 3 is in this case —at the same temperatures—substantially equal to the outside diameter of the shaft. The ring is overheated with respect to the shaft only just sufficiently for it to be slipped on to the shaft without any appreciable displacement of the top plastics layer (see FIG. 8).

The shaft together with the outer ring is then finally cured (FIG. 9). The former 6 is then removed and the shaft cut to length. The inner ring 21 at room temperature or cooled if necessary is then inserted, similarly to FIG. 6, into the end of the shaft prepared in this way and still warm from the curing process, and then the entire assembly is left to cool to room temperature.

The advantage of this method is that the surface of the shaft requires no special preparation in the clamping area and the shaft heat treatment required in any case for curing can also be used for shrinking so that the latter operation is greatly simplified.

In conclusion it should be stated that the two rings can be clamped not only thermally but, of course, by any other method. For example, the inner ring can be expanded mechanically or the outer ring clamped mechanically.

The functioning of the connection according to the invention under fatigue stress is very dependent upon the clamped parts, i.e. the two rings and the shaft, having basically the same behaviour under temperature changes. More particularly, the coefficients of thermal expansion of these parts circumferentially must be as close as possible, and the degree of agreement must be all the greater, the greater the temperature range in which the connection is required to be fully operable. In practice it is sufficient for the coefficients of expansion to differ by not more than about 20%. Of course absolute equality is the optimum.

The connection according to the invention is suitable more particularly for securing power input fittings in plastics power transmission shafts. Plastics tubes suitable for such shafts and wound from carbon fibres are described, for example, in Published European Patent Application No. 0009007. One characteristic of these shafts is a winding structure in which all the reinforcement fibres are oriented at a relatively narrow range of angles of from 0° to about ±30° to the shaft axis. When conventional plastics are used, this winding structure gives coefficients of thermal expansion circumferentially of about $20-25.10^{-6}/K$. Aluminum can be used as the material for the power input fitting in that case and with its coefficient of expansion of about $23.10^{-6}/K$ is most suitable for the shaft.

We claim:

1. A connection between a fiber reinforced plastic torque transmission shaft and a torque input fitting wherein said transmission shaft is reinforced with high rigidity fibers oriented in an angular range of from 0° to ±30° to the shaft axis, said connection comprising a first metal ring forming part of the input fitting which extends into an end zone of the transmission shaft and a second metal ring which extends over said end zone of the transmission shaft, said first and second metal rings frictionally clamping the wall of the transmission shaft in its end zone therebetween, the clamping stresses in said first and second metal rings being so matched that the mean diameter of the transmission shaft in the clamped end zone is substantially equal to that in the adjacent area, and the said first and second metal rings consisting of a material whose coefficient of thermal expansion circumferentially differs by not more than about 20% from that of the transmission shaft.

2. The connection according to claim 1 wherein the coefficient of thermal expansion of said first and second metal rings basically equals that of the transmission shaft.

3. The connection according to claim 1 wherein the coefficient of thermal expansion of the transmission shaft circumferentially is about $20-25 \cdot 10^{-6}/K$ and the said first and second metal rings consist of aluminum.

4. A connection according to claim 1, characterised in that one of the two rings (3, 21) circumferentially has a rigidity at least five times greater than the other ring.

5. A connection according to claim 1, characterised in that the rings (3, 21) are under a thermally produced prestressing.

6. A connection claim 1, characterised in that the two rings (3, 21) are interconnected so that they cannot rotate relatively to one another.

7. A connection according to claim 1, characterized in that ring (21) which is part of the input fitting is disposed inside the shaft.

* * * * *